United States Patent [19]

Ito et al.

[11] 4,154,518
[45] May 15, 1979

[54] PHOTOGRAPHIC CAMERA

[75] Inventors: Fumio Ito; Mutsunobu Yazaki, both of Yokohama, Japan

[73] Assignee: Canon Kabushiki Kaisha, Tokyo, Japan

[21] Appl. No.: 817,679

[22] Filed: Jul. 21, 1977

[30] Foreign Application Priority Data

Jul. 23, 1976 [JP] Japan ................................ 51-88026

[51] Int. Cl.² ........................ G09B 17/00; G09B 17/50
[52] U.S. Cl. ...................................... 354/83; 354/150; 354/202
[58] Field of Search ................... 354/83, 86, 150, 154, 354/155, 174, 202, 241, 21

[56] References Cited
U.S. PATENT DOCUMENTS

| | | | |
|---|---|---|---|
| 3,608,456 | 9/1971 | Hauser | 354/150 X |
| 3,754,458 | 8/1973 | Plummer | 354/154 |
| 4,109,259 | 8/1978 | Tarr | 354/86 |

Primary Examiner—John Gonzales
Attorney, Agent, or Firm—Toren, McGeady and Stanger

[57] ABSTRACT

A photographic camera of the type having at least one reflection mirror positioned in a space between an objective lens optical system and a film plane so that an image bearing beam of light rays entering through the objective lens optical system after reflection from the mirror is deflected to the film plane, includes a dust-proof shutter device for sealing the space containing the mirror from a film casette chamber when a film casette is loaded in the chamber therefor, in order to prevent dust and other falling particles from entering a photo-taking optical system chamber containing the mirror through an opening for the loading and removal of the film cassette.

16 Claims, 9 Drawing Figures

PHOTOGRAPHIC CAMERA

BACKGROUND OF THE INVENTION

1. Field of the Invention

This invention relates to photographic cameras.

2. Description of the Prior Art

Recently, in order to shorten the distance between a photo-taking lens optical system and a film exposure position where a film is arranged for exposure purposes, a plurality of reflection mirrors is arranged between said photo-taking lens optical system and said film exposure position so that an image bearing beam of light rays entering through the photo-taking lens optical system is subjected to successive deflections by the plurality of reflection mirrors in a zigzag manner, thereby shortening the distance between the photo-taking lens optical system and the film exposure position.

This kind of mirror system can be widely found particularly in photographic cameras capable of developing the film upon the pulling-out of the exposed photographic film from the camera, during the pulling process to provide a positive image, or in the so-called "instant photographic cameras".

What is considered as a reason why this instant photographic camera generally requires this type of optical system is that the image formed on the photographic film which is used in the instant photographic camera is the same size as the finished positive photograph, as opposed to the image on the photographic film which is used in the usual camera, where only a negative image is made on said film and this negative image is enlarged to form a positive image in another printing paper. If the size of instant type of film is too small, therefore, the finished photograph is difficult to appreciate. Such instant film is therefore made large, as compared with a roll film of 35 mm size. Therefore, on the instant film, a large image must be projected so that the distance between the photo-taking lens optical system and the film exposure position must be increased sufficiently. However, as the distance between the photo-taking lens optical system and the film exposure position is increased, the dimensions of the camera are proportionally increased, resulting in a camera so large that it is inconvenient to carry. In order to solve this problem, in the instant photographic camera, a front housing in which the photo-taking lens optical system is arranged and a rear housing in which the film exposure position is provided are formed separately, and connected with each other by an expandable bellows. When photography is performed, the bellows is expanded with the front housing and the rear housing being separated from each other to such an extent that the photo-taking lens optical system and the film exposure position are held at a suitable distance. Conversely, when in carrying without performing photography, the bellows is compressed so that the front housing and the rear housing are brought into intimate contact with each other, thereby making the camera compact and easy to carry. This kind of instant photographic camera has a complicated mechanism for assuring the accuracy of the distance between the front housing and the rear housing when photographs are being taken. And, as a method of facilitating the compactness of the camera without using the above mentioned complicated folding mechanism, it is known to arrange a plurality of reflection mirrors between the photo-taking lens optical system and the film exposure position to cause an image bearing beam of light rays passing through the photo-taking lens optical system to be successively deflected by the plurality of reflection mirrors in a zigzag manner, thereby reducing the distance between the photo-taking lens optical system and the film exposure position to provide a compact camera while eliminating the necessity for folding. In this type of instant photographic camera, because of the lack of the folding mechanism, the structure can be simplified, and, because of the normally fixed distance between the photo-taking lens optical system and the film exposure position it is possible to obtain a camera of extremely high precision. However, such type of photographic camera in which a plurality of reflection mirrors are arranged between the photo-taking lens optical system and the film exposure position to cause successive deflections of the image bearing beam entering through the photo-taking lens optical system by the reflection mirrors in a zigzag manner gives rise to the problem that as the image bearing beam of light incident upon the exposure position from the photo-taking lens optical system is always directed thereto by the above mentioned reflection mirrors, when dust and the like are deposited on said reflection mirrors, an important influence is exerted on photography. In other words, when dust and the like adhere to the reflection mirrors, this dust is imaged into the film. For this reason, as soon as the photographer is aware of the fact that dust has adhered on the above mentioned reflection mirrors and the like, the dust must be removed. In order to remove this dust, a piece of cloth has to be inserted through the film insertion slot, or, if it is impossible, it is necessary to disassemble the camera. Thus, the removal of dust is very troublesome. And, the adhesion of dust to said reflection mirrors usually results when the film is inserted into the camera, thereby permitting the dust to enter from the film insertion slot and to adhere on the reflection mirrors.

SUMMARY OF THE INVENTION

A first object of the present invention is to provide a photographic camera capable of preventing dust and the like from adhering to the reflection mirrors in a photographic camera of the type in which a plurality of reflection mirrors is arranged between a photo-taking lens optical system and the above mentioned film exposure position so that an image bearing beam of light coming through the above mentioned photo-taking lens optical system is successively reflected by the above mentioned plurality of reflection mirrors to be incident on the above mentioned film exposure position.

A second object of the present invention is to provide a photographic camera in which in order to prevent dust from adhering to the reflection mirrors, which becomes a problem in the above described type of photographic camera, a chamber in which the aforesaid reflection mirror is arranged is sealed from a film accommodating chamber by a dustproof shutter device. Thus, when a film is loaded into the aforesaid camera the dust is prevented from entering the reflection mirrors chamber through the insertion slot.

A third object of the present invention is to provide a photographic camera in which the aforesaid dustproof shutter device is actuated in response to the loading and removal operation of the film by way of the aforesaid film insertion slot.

A fourth object of the present invention is to provide a photographic camera in which, when a film is loaded or removed through the film insertion slot, the aforesaid dustproof shutter device is automatically actuated in response to automatic detection of the loading and removal of that film.

Other objects of the present invention will become apparent from the detailed description taken in conjunction with the accompanying drawings in which:

DESCRIPTION OF THE PREFERRED EMBODIMENTS

A number of embodiments of photographic cameras according to the present invention will next be explained in detail while being compared with the conventional photographic camera.

Figure 1:
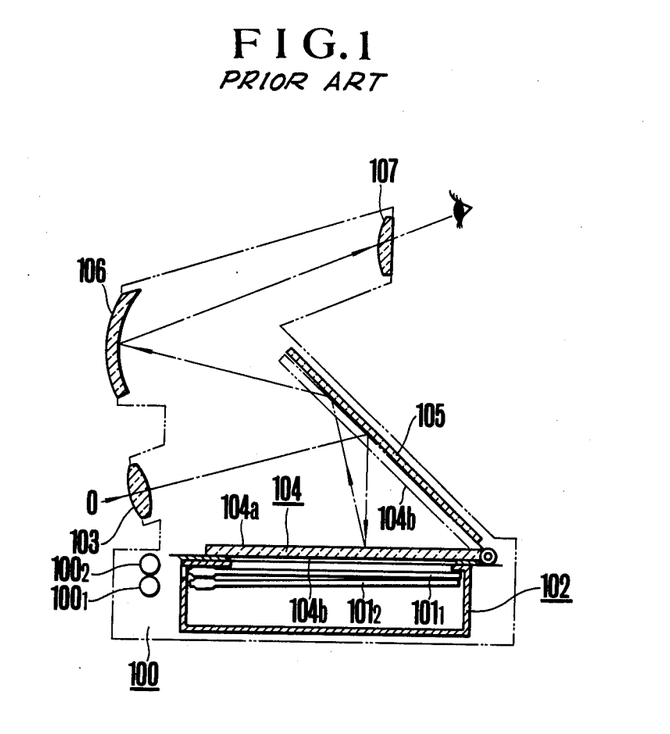
FIG. 1 is a longitudinal sectional view showing an example of a conventional instant photographic camera in which a reflection mirror is arranged between a photo-taking lens optical system and a film exposure position so that an image bearing beam of light coming through said photo-taking lens optical system is deflected by said reflection mirror to impinge on said film exposure position.

FIG. 1 is a longitudinal sectional view of an example of a conventional photographic camera, as, for example, disclosed in U.S. Pat. No. 3,958,261, where a reflection mirror is arranged between a photo-taking lens optical system and a film exposure position so that an image-bearing beam of light coming through the aforesaid photo-taking lens optical system is deflected by the aforesaid reflection mirror to impinge on the aforesaid film exposure position. In this photographic camera shown in FIG. 1, a film cassette 102 containing a photographic film 101 is arranged in a cassette accommodating chamber provided in a camera body 100 so as to arrange an uppermost stacked film $101_1$ at the aforesaid film exposure position. And, this photographic camera has a front and rear surface reflection mirror 104 displaceable between a position where an incident ray of light 0 entering from the photo-taking lens optical system 103 into the camera body 100 is prevented from impinging on the photographic film $101_1$ arranged in the film exposure position (as shown by solid lines in FIG. 1) and a position where the incident light ray 0 is permitted to impinge on the photographic film $101_1$ arranged in the film exposure position (as shown by dashed lines in FIG. 1). When the camera is being focussed, or when the photograph is being composed the duplicated reflection mirror 104 takes the position of the solid lines in FIG. 1. A light ray 0 coming from an object to be photographed through the photo-taking lens system 103 is received by a mirror 105, then deflected by said mirror 105 to the mirror 104. The light ray 0 deflected by the mirror 105 is further deflected by the front and rear surface reflection mirror 104 at the surface 104a thereof to the mirror 105, and after further deflection therefrom to a curved mirror 106 is directed from the curved mirror 106 to a range finder optical system 107. On the other hand, when the camera shutter mechanism is actuated the front and rear surface reflection mirror 104 is in a stacked position to the mirror 105 (as shown by the dashed lines in FIG. 1), the light ray 0 entering past the photo-taking lens system 103 is deflected by the front and rear surface reflection mirror 104 at the surface 104b to impinge on the aforesaid film exposure position so that the film $101_1$ arranged in said film exposure position is exposed.

The camera of such construction operates in such a manner that in order to make an exposure on the photographic film $101_1$ in the film cassette 102 arranged in the cassette accommodating chamber, the image bearing beam of light rays 0 coming through the photo-taking lens system must be always once deflected by the reflection mirror 104b to impinge on the photograph film $101_1$. Therefore, when the mirror surface 104b deflecting by reflection the object bearing beam from the photo-taking lens system to the photographic film $101_1$ is contaminated with dust and the like, this dust is recorded in the film $101_1$, thus producing a disturbing influence. However, in this type of photographic camera shown in FIG. 1 the reflection surface 104b contributing most to photography during the exposure operation may be easily contaminated with dust and the like, thus giving rise a necessity of frequent cleaning. What causes the high possibility of contamination of this reflection surface with dust and the like is that when the film cassette 102 is loaded in or removed from the cassette chamber, the aforesaid reflection surface 104b is exposed to the cassette chamber. When the film cassette 102 is loaded in or removed from the cassette chamber, the dust which has entered through the opening of the aforesaid cassette chamber directly adheres to the aforesaid reflection surface 104b.

The films $101_1$, $101_2$, .... $101_n$ and the film cassette 102 shown in FIG. 1 may be sheet films of a self-development process type and a film cassette disclosed, for example, in U.S. Pat. No. 3,810,211. Each of these film sheets 101 has a package containing a self-development processing solution and arranged after photography upon being taken out of the camera body 100 following exposure past space between rotary pressure rollers $100_1$ and $100_2$ constituting a film transporting device in the camera, to be broken by the pressure exerted between the aforesaid pressure rollers $100_1$ and $100_2$. The development processing solution squeezed from the broken package is uniformly spread on the film surface by the aforesaid pressure rollers $100_1$ and $100_2$. This sheet-like film 101 is contained in the film cassette 102 in the stacked relation, as this film 101 comprises a plurality of film sheets, and is loaded in and removed from the camera body 100 along with the film cassette 102.

Next, FIGS. 2 to 5 show a first embodiment of a photographic camera according to the present invention, and an instant photograhic camera is shown as an example.

In FIGS. 2 to 5, 1 is a camera body, 2 is a lens barrel, 3 is a photo-taking lens system arranged in the lens barrel 2, and 4 is a lens shutter arranged in the lens barrel 2. In this embodiment of the photographic camera, when the lens shutter 4 is opened, a light ray $0_1$ passing through the photo-taking lens system 3 and the lens shutter 4 is reflected by a first mirror 5 and a second mirror 6 supported in the camera body 1 to impinge on a film $101_1$ in a cassette 102 loaded in a cassette chamber 1A provided in the camera body 1. The film and film cassette shown in the embodiment of the invention may be the film and film cassette explained in connection with FIG. 1. An upper cover 8 is constructed to be pivotal about a hinge 9 on the camera body 1 for selectively shielding an opening of a cassette chamber 1A. Said upper cover 8 has rollers $10_1$ and $10_2$ arranged therein to apply a pressure on the film 101 pulled out of the aforementioned film cassette 102 after the film 101 is exposed for the purpose of self-development and to transport the film 101 to the outside of the camera body 1. A film exit 11 is provided in a portion of the upper cover 8. A rubber plate 12 prevents light rays from entering through the aforesaid film exit 11 and, as the film 101 is transported to the film exit 11 while being subjected to a self-developing operation by the rollers $10_1$ and $10_2$, prevents the film 101 from dropping down from the camera when the film 101 is finally pushed away from the rollers $10_1$ and $10_2$ to protrude from the film exit 11. The aforesaid rubber plate 12 is fixedly mounted on the camera body 1. An upper cover locking member 13 is arranged slidably on the upper cover 8. By a sliding movement of said locking member, opening and closing lock of the upper cover 8 can be performed. A spring member 14 is used for holding the cassette 102 in a predetermined position of the cassette chamber 1A. The spring member 14 always urges the cassette 102 in a forward direction. A spring drum 15 of a dustproof shutter is provided for preventing dust which has entered through the opening of the cassette chamber 1A from adhering to the mirrors 5, 6. Arranged in the drum 15 is a coil spring 16 as shown in detail in FIG. 4. The aforesaid spring 16 is engaged with a fixed shaft 17 at one end thereof, the opposite end of which is engaged with the drum 15 rotatable about the aforesaid fixed shaft 17. And this spring 16 contributes to urge the drum 15 for rotation in a counterclockwise direction. At one end of the aforesaid spring drum 15 there is provided a gear portion 15a permanently engaged with a first step gear $18_2$ of a double gear 18 rotatably mounted on the camera body 1. A gear 19 is rotatably mounted on the camera body 1 and is permanently engaged with a second step gear $18_1$ of the aforesaid double gear 18. When the aforesaid spring drum 15 is rotated, rotative movement of said drum 15 is transmitted through the gears 15a and 18 to said gear 19. The gear 19 is thereby rotated in linkage with said drum 15. Further, the gear 19 has an eccentric pin 19a thereon, and the aforesaid eccentric pin 19a actuates a switch SW2 fixedly mounted on the camera body 1 when it is rotated and limits rotation of said gear 19 by means of a stop 20 fixedly mounted on the camera body 1. A dustproof shutter curtain 21 is affixed to the drum 15 at one end thereof, the opposite end of which is affixed to ribbons 22 through a metal fixture 21a. The outer ends of the ribbons 22 are fastened by screws on collars 23a of a shaft 23 rotatably mounted on the camera body 1, and are wound on said collars 23a. Further, the ribbons 22 pass through holes $1C_1$ of the camera body 1 and interconnect the shutter curtain 21 and the collars 32a. A gear 24 is affixed to the aforementioned shaft 23 and always meshes with a gear 26 affixed to the shaft of a motor 25. 24a is a pin on the aforementioned gear 24. A turnable lever 27 is affixed to a shaft rotatably mounted on the camera body 1, and said turnable lever 27 is provided with an engaging portion 27a engageable with a pin 24a on the aforementioned gear 24, a detecting portion 27c for detecting the loading and removal of the film cassette 102 and a switch control portion 27b for controlling opening and closure of a switch SW3 fixedly mounted on the camera body 1. And, said turnable lever 27 is biassed for rotation in a counterclockwise direction by a tension spring 28, one end of which is connected to the camera body 1 and the other end of which is engaged with said turnable lever 27, so that when the film cassette 102 is inserted into the cassette chamber 1A, said turnable lever 27 is turned by said cassette 102 in the clockwise direction against the force of tension of the spring 28 to close the switch SW3 and to arrange the engaging portion 27a in a position out of the path of rotation of the pin 24a on the gear 24. Further, conversely in response to the the removal of the film cassette 102 from the cassette chamber 1A, the pressing force on the detecting portion 27c provided by said film cassette 102 is gradually reduced to turn the turnable lever 27 in a counter-clockwise direction, whereby the switch SW3 is closed.

Figure 2:
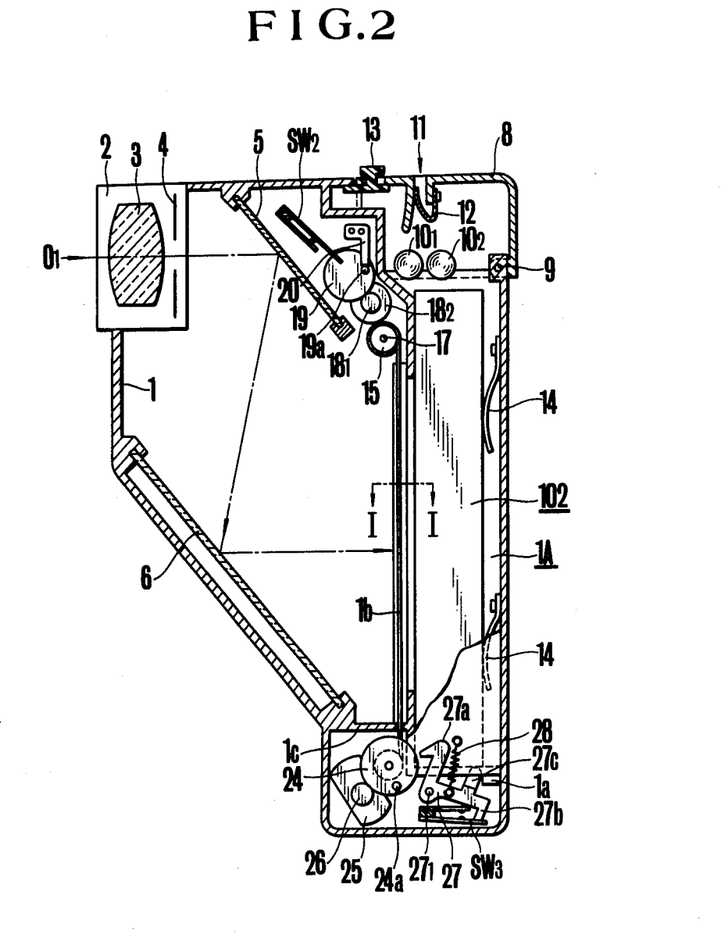
FIGS. 2 and 3 are longitudinal sectional views showing a first embodiment of a photographic camera according to the present invention with FIG. 2 showing a state in which a film cassette is loaded in a camera and with FIG. 3 showing a state in which the film cassette is removed from the camera.
Figure 3:
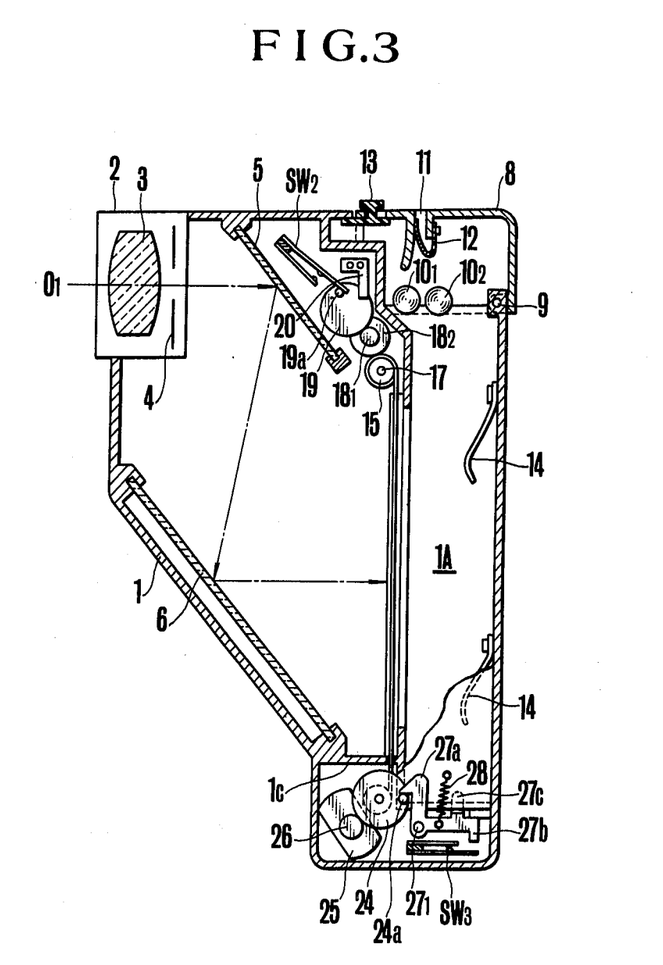
Figure 4A:
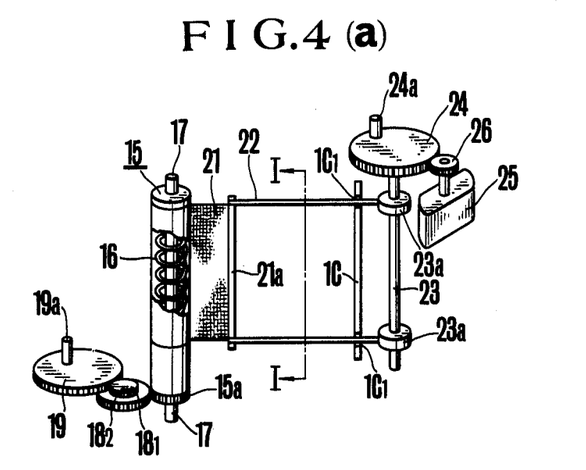
FIG. 4 is views showing a dustproof shutter device arranged in the photographic camera shown in FIG. 2 and FIG. 3, with FIG. 4(a) being a perspective view of the device and with FIG. 4(b) being a sectional view taken along a line I—I of FIG. 4(a).
Figure 4B:
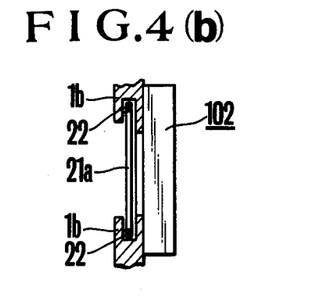
Figure 5:
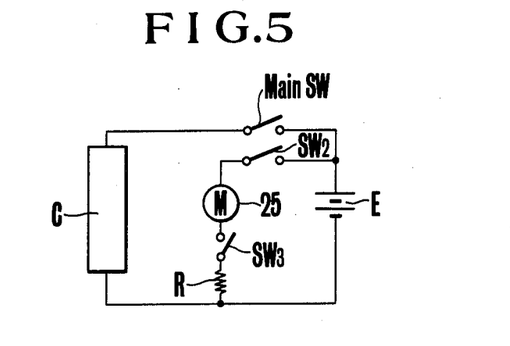
FIG. 5 is an electrical circuit diagram of an apparatus for controlling the photographic camera of the present invention shown in FIGS. 2 to 4.

FIG. 5 is a diagram of an electrical circuit for controlling the photographic camera of the present invention shown in FIGS. 2 to 4. E is an electrical power source and C is a circuit for performing a general control of the camera such as the exposure control of the camera and the film feed. R is a resistor, and SW2 is a normally closed type of switch which is opened when the dustproof curtain 21 is wound up by a predetermined amount by the motor 25. SW3 corresponds to the switch shown in FIGS. 2 and 3 and is a normally closed type of switch which is opened by the lever 27 when the cassette 102 is inserted into the cassette chamber 1A of the camera body 1.

The operation of the photographic camera of the present invention constructed as shown above will next be explained.

FIG. 2 shows a state where the cassette 102 is loaded in the cassette chamber 1A of the camera body 1. In this state, a large portion of the dustproof shutter curtain 21 is wound in the drum 15 so that when the lens shutter 4 is operated by a shutter button (not shown), the light ray $0_1$ coming from an object to be photographed through the photo-taking lens system 3 is permitted to impinge on the mirror 5, then deflected from said first mirror 5 in a direction to the second mirror 6, and then deflected by the second mirror 6 to the film plane of the film cassette 102 arranged in the exposure position within the cassette chamber 1A.

Further, the lever 27 is turned against the force of tension of the spring 28 in the clockwise direction about the shaft $27_1$ fixed to the camera body 1 as the cassette detecting portion 27c is pressed by the insertion of the cassette 102, whereby the switch SW3 is brought to an open state by the switch control portion 27b. Further, the pin 19a on the gear 19 assumes a position for engagement with the stopper 20 where the switch SW2 is in the closed state. When the exposure of the film within the cassette 102 is terminated by operation of the shutter button, the rollers $10_1$ and $10_2$ are rotated by a driving mechanism not shown, and at the same time only one film sheet which has been exposed is pushed out of the cassette 102 into a space between the rollers $10_1$ and $10_2$. The film 101 pushed into the space between the aforesaid rollers $10_1$ and $10_2$ is rolled between the aforesaid rollers $10_1$ and $10_2$. During this rolling operation, a self-development processing solution provided in the film is applied to the exposed surface, whereby the development takes place. This method is accomplished by a known means which has already mentioned above. The film 101 coming past the rollers $10_1$ and $10_2$ thereafter protrudes from the film exit 11 to the outside of the camera body 1.

Next, after all the film sheets 101 in the film cassette 102 have been exposed, in order to exchange the film cassette 102 for new one, the lock between the camera body 1 and the upper cover 8 will be taken off by slidingly moving the locking member 13 to the left, whereby the upper cover 8 is rendered pivotable about the hinge 9 in the clockwise direction. In this state, upon pivotal movement of the upper cover 8 in the clockwise direction, the upper cover 8 is opened. With this upper cover 8 in the open state, the cassette 102 will be taken out of the cassette chamber 1A, whereby the lever 27 is turned in the counter-clockwise direction under the action of the spring 28 in response to the removal of the cassette 102, and therefore the cassette detecting portion 27c gradually enters the cassette chamber 1A, while the switch control portion 27b actuates the switch SW3 for closure. At this time, the one end 27a of the lever 27 is positioned to be engageable with the pin 24a on the gear 24. By closing the switch SW3 the motor 25 is thereafter rotated. As the motor 25 rotates, the rear 26 affixed to the shaft of the motor 25 rotates in the counter-clockwise direction. As the gear 26 rotates, the gear 24 normally meshing with said gear 26 rotates in the clockwise direction. During this rotation of the gear 24, the shaft 23 of the aforesaid gear 24 winds up the ribbons 22. As the aforesaid ribbons 22 are wound up, the drum 15 is also rotated. This rotation of the drum 15, while winding the spring 16 in the drum 15, rotates the gear 19 in the clockwise direction through the gear train ($15a$, $18_1$, $18_2$). As the gear 19 is rotated in such a manner, the dustproof shutter curtain 21 is moved along an exposure aperture opening. When the dustproof shutter curtain 21 has covered all the area of the exposure aperture opening, the switch SW2 is opened by the pin 19a to cut off the power supply to the motor 25, and the pin 24a of the gear 24 is also engaged with the one end 27a of the lever 27 to prevent the gear 24 from being rotated in the reverse direction by the force of the tensioned spring 16 in the drum 15. Therefore, when the motor 25 is stopped, the shutter curtain 21 tends to return back by the force of the spring 16, but the engagement of the pin 24a of the gear 24 with the end 27a of the lever 27 hinders a return movement of the shutter curtain 21. As a result, it assumes a state shown in FIG. 3. In other words, in this state of FIG. 3, the dustproof shutter curtain 21 is closed to seal the space in which the reflection mirrors are arranged from the film cassette chamber 1A so that even when the upper cover 8 is opened, there is no possibility of causing dust to enter the space in which the photographic optical elements such as the first and second mirrors 5 and 6 and the photo-taking lens system 3 are located.

After the used film cassette 102 has been taken out of the cassette chamber 1A in such a manner as described above, a new film cassette 102 is then inserted into the cassette chamber 1A, whereby the cassette detecting portion 27c of the pivotal lever 27 which is positioned to protrude into the cassette chamber 1A is pushed by the forward edge of that film cassette 102 to turn in the clockwise direction against the force of the spring 28. And, when this film cassette 102 is completely loaded in the cassette chamber 1A, the switch SW3 is opened and the pin 24a on the gear 24 is disengaged from the engaging portion 27a of the pivotal lever 27. When this disengagement of the pin 24a of the gear 24 from the engaging portion 27a of the pivotal lever 27 occurs, the gear 27 is rotated in the counter-clockwise direction by the tensioned spring 16 in the drum 15 so that the dustproof shutter curtain 21 is wound up on the drum 15 to remove the shield between the film cassette chamber 1A and the space in which the photographic optical elements are arranged. And, during the time when the drum 15 winds up the dustproof shutter curtain 21, the gear 19 rotates in unison with the drum 15 through the gears $15a$, $18_1$ and $18_2$ until the pin 19a on the gear 19 abuts the stop 20. In other words, the stop 20 and the pin 19a, limit the amount of rotation of the drum 15 for winding up the dustproof shutter curtain 21. And, as the camera mechanism changes from the state of FIG. 3 to the state of FIG. 2, the exchange of the film cassette is completed.

Figure 6:
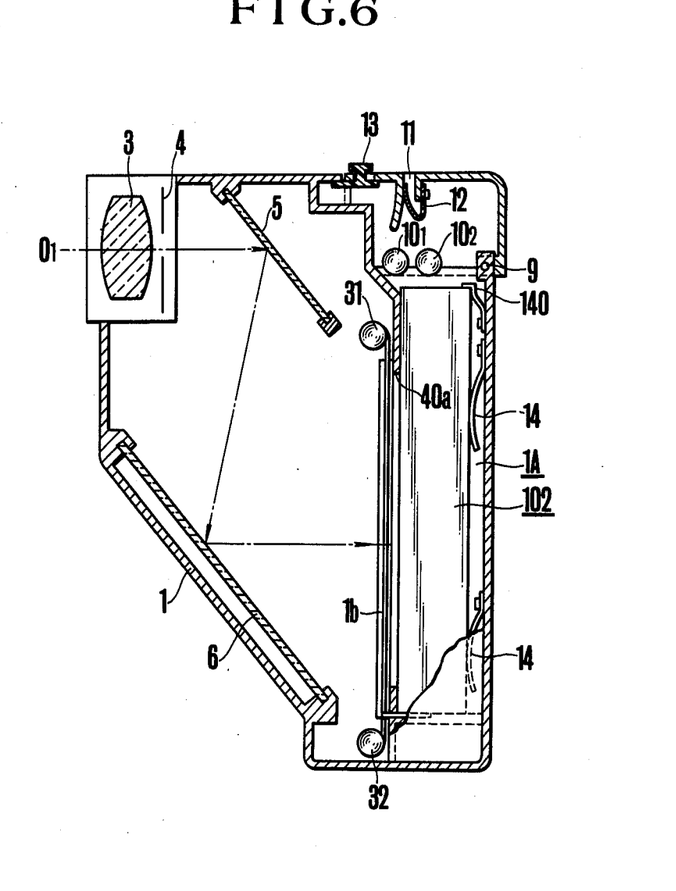
FIG. 6 is a longitudinal sectional view showing a second embodiment of the photographic camera according to the present invention.

FIG. 6 is a longitudinal sectional view of a second embodiment modified of the first embodiment of the photographic camera of the present invention shown in FIGS. 2 to 5, and FIG. 7 is a perspective view showing a dustproof shutter device arranged in the photographic camera shown in FIG. 6.

Figure 7:
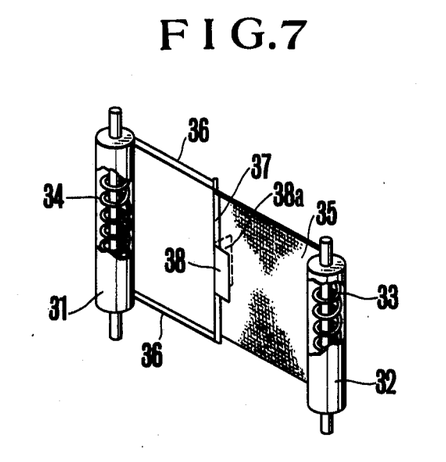
FIG. 7 is a perspective view showing a dustproof shutter device arranged in the photographic camera shown in FIG. 6.

The point of difference between the first embodiment shown in FIGS. 2 to 5, and the second embodiment shown in FIGS. 6 and 7 is that, while the aforementioned first embodiment employs a motor 25 for driving the shutter curtain in response to the detection of the loading operation of the film cassette 102 in the cassette chamber 1A by the cassette detecting portion 27c of the pivotal lever 27 to effect the shutter operation of the dustproof shutter curtain 21, the second embodiment does not employ such a motor but uses springs 33 and 34 for performing the shutter operation of the dustproof shutter curtain 21 together with respective drums 32 and 31 on which the shutter curtain and the ribbons are wound up respectively. The spring 33 and the spring 34 provide weak biassing forces, but the biassing force of the spring 33 is somewhat weaker than that of the spring 34, so that when the cassette 102 is absent in the cassette chamber 1A, the ribbons 36 are wound up on the drum 31, while the dustproof shutter curtain 35 is permitted to extend over the entire area of the exposure aperture or film gate, whereby the dustproof shutter device is set in the closed position. A metal fixture 37 fastens the ribbons 37 to the dustproof shutter curtain 35, and 38 in an L-shape metal member attached as saddled between the dustproof shutter curtain 35 and the metal fixture 37 and arranged to be engageable with one end of the cassette 102 and also to define the position of the dustproof shutter curtain 35 in engagement with one end 40a of an exposure aperture 40 formed in the camera body 1 at the aforesaid film exposure position when the dustproof shutter curtain is closed. As the fixture 37 is guided by 1b in a manner similar to that shown in FIG. 4(b), it can be moved in a direction either to the ribbon winding up drum 31 or to the dustproof shutter curtain winding up drum 32 while being maintained in the state of FIG. 7, even when an external force is applied to the member 38a.

In operating the dustproof shutter device of such construction, when the cassette 39 is located, one end of the cassette 102 is engaged with the member 38a, and the shutter curtain 35 is wound up on the drum 32 by the force of spring 33, whereby the dustproof shutter device is set to a position where an exposure may be made. Further, when the cassette 39 is taken out, because of the loss of the force to the member 38a, and because of the stronger biassing force of the spring 34 than that of the spring 33, the ribbons 36 are wound up on the drum 31 while the shutter curtain 35 runs up to act as a shield between the cassette chamber 1A and the photographic optical arrangement, whereby dust is prevented from entering the space in which the photographic optical elements such as the mirrors are arranged.

In FIGS. 6 and 7, 140 is a stop having biassing characteristics for urging the film cassette 102 in a direction in which the film cassette 102 is inserted into the cassette chamber 1A and for preventing the film cassette 102 from accidentally moving in the aforesaid cassette chamber 1A, and said stop 140 is bent in the clockwise direction to be moved away from the path of travel of the film cassette when the film cassette 102 is loaded, whereby the loading and removal of the film cassette 102 is made easy.

Figure 8:
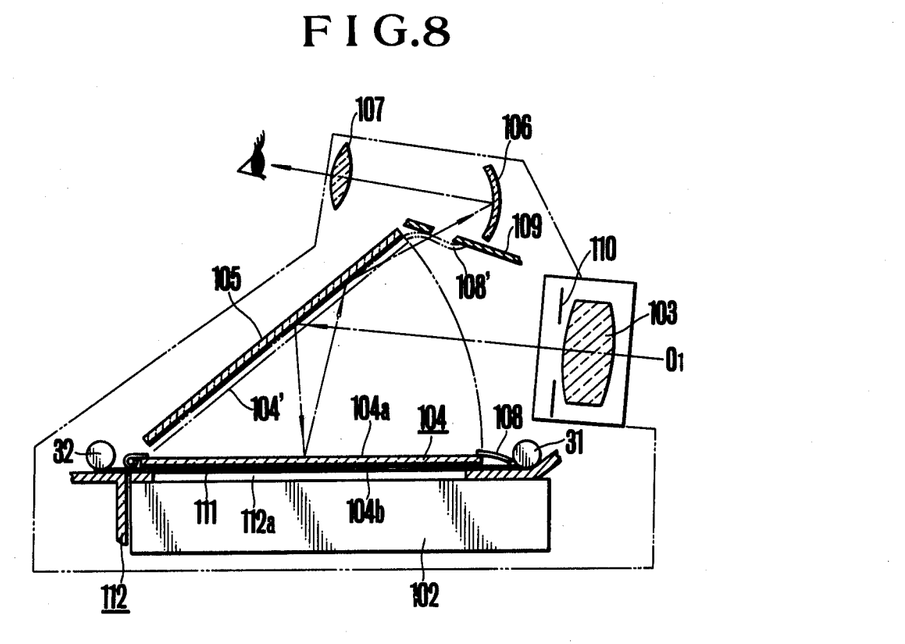
FIG. 8 is a longitudinal sectional view showing a third embodiment of the photographic camera according to the present invention.

FIG. 8 is a longitudinal sectional view showing a third embodiment of a photographic camera according to the present invention. This photographic camera has a front and rear reflection mirror 104 displaceable between a position where light entering through the photo-taking lens system 3 is prevented from impinging upon the film cassette 102 containing a photographic film 101 and a position where light entering through the photo-taking lens system 3 is permitted to impinge upon the photographic film 101 in the film cassette 102. When focussing prior to the making of an exposure, or when the mirror 104 is set in the position shown by the solid lines in FIG. 8, a ray of light $O_1$ entering through the photo-taking lens system 3 is deflected by the mirror 105 to the mirror 104, then the deflected light ray from the mirror 105 is further deflected by reflection from the surface 104a of the mirror 104 again to the mirror 105 and therefrom directed to a curved mirror 106 constituting a range finder optical system together with an eye-piece 107. On the other hand, when the mirror 104 is stacked on the mirror 105, the light ray entering through the photo-taking lens system 3 is reflected by the front and rear reflection mirror 104 at its surface 104b to the film 101 so that an image of an object being photographed is formed on the film 101.

In this photographic camera, any one of the dustproof shutter devices for the photographic camera shown in FIGS. 2 to 5 and FIGS. 7 and 8 is arranged between the front and rear reflection mirror 104 and the film exposure position 112a of a cassette chamber 1A for accommodating a film cassette 102 to keep off the shield between the space containing the front and rear reflection mirror 104 and the film exposure position when the cassette 102 is loaded in the cassette chamber 1A and to shield the space containing the front and rear reflection mirror 104 from the cassette chamber 1A when the cassette 102 is taken out of the cassette chamber 1A. With this dustproof shutter device, it is possible to prevent dust from contaminating the front and rear reflection mirror 104.

As has been explained, the present invention provides a photographic camera of the type in which at least one reflection mirror is arranged between a photo-taking lens optical system and a film exposure position so that an image bearing beam of light rays coming past the aforesaid photo-taking lens optical system is deflected by the aforesaid reflection mirror to impinge upon the film exposure position, whereby the space in which the aforesaid reflection mirror is arranged is sealed from the film cassette chamber by a dustproof shutter device when a film is loaded in the aforesaid camera to prevent dust from entering the reflection-mirror-containing space through the film insertion slot, thus providing a very important advantage that the aforesaid mirror can be maintained clear out of dust which would otherwise accumulate on the mirror each time the film loaded and removed, and therefore that the very troublesome operation of cleaning the mirror can be eliminated.

What is claimed is:
1. A photographic camera including:
   (a) a camera housing having;
      a film accommodating chamber having an opening through which a film is loaded and removed;
      a photographic optical instrument chamber in communication with said film accommodating chamber;
   (b) photographic lens means for introducing an image bearing beam of light into said photographic optical instrument chamber;
   (c) reflection mirror means arranged in said photographic optical instrument chamber to direct said image light beam from said photographic lens means to said film accommodating chamber; and
   (d) dustproof shutter means for providing a shield between said film accommodating chamber and said photographic optical instrument chamber in response to the removal of film from said film accommodatng chamber and for removing said shield in response to loading said film into said accommodating chamber.

2. A camera as described in claim 1, wherein said dustproof shutter means further comprises detecting means for detecting the loading and removal of said film into and from said film accommodating chamber, and means for actuating said dustproof shutter means for shielding said photographic optical instrument chamber when said detecting means detects the removal of said film, and for removing the shielding when said detecting means detects the loading of said film.

3. A camera as described in claim 2, wherein said means for actuating said dustproof shutter means comprises a driving motor controlled by said detecting means.

4. A camera as described in claim 1, wherein said photographic lens means is provided with a lens shutter.

5. A photographic camera including:
   (a) a camera housing having;
      a cassette accommodating chamber having an opening through which a film cassette containing a film is loaded and removed; and
      a photographic optical instrument chamber formed in communication with said film cassette accommodating chamber;
   (b) photographic lens means for introducing an image bearing beam of light into said photographic optical instrument chamber;

(c) reflection mirror means arranged in said photographic optical instrument chamber for directing said object beam from said photographic lens means to said cassette accommodating chamber;

(d) dustproof shutter means for providing a shield between said cassette accommodating chamber and said photographic optical instrument chamber when said cassette is removed from said cassette accommodating chamber and for removing said shield in response to loading said film into said accommodating chamber; and (e) detecting means for detecting the loading and removal of said cassette in and from said cassette accommodating chamber for controlling said dustproof shutter means, said detecting means being arranged to extend at a portion thereof into the path of travel of said cassette as said cassette is loaded into and removed from said cassette accommodating chamber.

6. A camera as described in claim 5, wherein said dustproof shutter means has:
a shutter curtain positionable as a shield between said cassette accommodating chamber and said photographic optical instrument chamber;
a driving motor means for automatically operating said shutter curtain; and
switch means for actuating said driving motor in response to the detection by said detecting means of the removal of said cassette from said cassette accommodating chamber.

7. A camera as described in claim 5, wherein said dustproof shutter means is provided with a shutter curtain positionable as a shield between said cassette accommodating chamber and said photographic optical instrument chamber, and resilient means for urging said shutter curtain to normally shield said cassette accommodating chamber from said photographic optical instrument chamber, and said detecting means is provided with means receptive to the loading force of said cassette during the loading operation of said cassette into said cassette accommodating chamber for causing said shutter curtain to be moved away from said cassette accommodating chamber and said photographic optical instrument chamber.

8. An instant photographic camera of self-processing type for use with a film cassette containing a plurality of sheet-like films, each sheet-like film having means for storing a developer and capable, after exposure, upon processing by said developer, of forming a visible image, which camera includes:

(a) a camera housing having;
a cassette accommodating chamber provided with an opening through which said film cassette is loaded and removed; and
a photographic optical instrument chamber formed in communication with said film cassette accommodating chamber;

(b) photographic lens means for introducing an image bearing beam of light into said photographic optical instrument chamber;

(c) reflection mirror means arranged in said photographic optical instrument chamber to direct said object beam from said photographic lens means to said cassette accommodating chamber;

(d) transporting means for advancing said film after being exposed past a processing station where said exposed film is processed by said developer and transported to the outside of said camera housing; a portion of said transporting means being arranged within said cassette accommodating chamber; and (e) dustproof shutter means for providing a shield between said film accommodating chamber and said photographic optical instrument chamber in response to the removal of said cassette from said cassette accommodating chamber and for removing said shield in response to the loading of said cassette into said cassette accommodating chamber.

9. A photographic camera including:
(a) a camera housing having:
a cassette accommodating chamber having an opening through which a film cassette containing a film is loaded and removed; and
a photographic optical instrument chamber formed in communication with said cassette accommodating chamber;

(b) photographic lens means for introducing an image beam of light into said photographic optical instrument chamber;

(c) reflection mirror means arranged in said photographic optical instrument chamber to direct said image beam from said photographic lens means to said cassette accommodating chamber;

(d) detecting means for detecting the loading and removal of said cassette in and from said cassette accommodating chamber; and (e) dustproof shutter means having;
shutter curtain means selectively arranged between said film cassette accommodating chamber and said photographic optical chamber for selectively providing a shield between said cassette accommodating chamber and said photographic optical instrument chamber;
shutter curtain winding up means for winding up said shutter curtain means to remove said shutter curtain means from a space between said cassette accommodating chamber and said photographic optical instrument chamber;
resilient means for urging said shutter curtain winding up means for normal winding up operation; and
shutter transporting means for transporting said shutter curtain means into the space between said cassette accommodating chamber and said photographic optical instrument chamber against the forece of said resilient means, and shutter transporting means being operatively connected to said detectign means and actuated in response to the detection by said detecting means of the removal of said cassette from said cassette accommodating chamber.

10. A camera as described in claim 9, wherein said shutter transporting means is provided with an electrical motor.

11. A camera as described in claim 10, wherein said shutter transporting means further comprises switch means for stopping said electrical motor when a predetermined amount of said shutter curtain means has been transported, and retaining means for retaining said shutter transporting means in that state which occurs when said electrical motor is stopped.

12. An instant photographic camera of self-processing type for use with a film cassette containing a plurality of sheet-like films, each sheet-like film being provided with means for storing a developer and capable, after exposure, upon processing by said developer, of forming a visible image, which camera includes:

(a) camera housing having;
   a cassette accommodating chamber having an opening through which said film cassette is loaded and removed; and
   a photographic optical instrument chamber formed in communication with said cassette accommodating chamber;
(b) photographic lens means for introducing an image beam of light into said photographic optical instrument chamber;
(c) reflection mirror means arranged in said photographic optical instrument chamber for directing said image beam from said photographic lens means to said cassette accommodating chamber;
(d) transporting means for advancing said film after being exposed past a processing station where said exposed film is processed by said developer to the outside of said camera housing; a portion of said transporting means being arranged within said cassette accommodating chamber;
(e) detecting means for detecting the loading and removal of said cassette into and from said cassette accommodating chamber, said detecting means being provided with a cassette detecting portion arranged to be retracted from said cassette accommodating chamber when said cassette is present in said cassette accommodating chamber and to protrude to a large extent into said cassette accommodating chamber when said cassette is absent therefrom, and
(f) dustproof shutter means comprising;
   shutter curtain means selectively arranged between said film cassette accommodating chamber and said photographic optical instrument chamber for providing a shield between said cassette accommodating chamber and said photographic optical instrument chamber;
   shutter curtain winding up means for winding up said shutter curtain means to remove said shutter curtain means from a space between said cassette accommodating chamber and said photographic optical instrument chamber;
   resilient means for urging said shutter curtain winding up means for normal winding up operation;
   shutter transporting means for transporting said shutter curtain means into the space between said cassette accommodating chamber and said photographic optical instrument chamber against the force of said resilient means, said shutter transporting means including a driving motor;
   first switch means for controlling said driving motor, said switch means being operatively connected to said detecting means and closing in response to the protruding action of said cassette detecting portion of said detecting means into said cassette accommodating chamber; and
   second switch means for controlling said driving motor, said second switch means being operatively connected to said detecting means and opening in response to the transportation by said shutter transporting means of said shutter curtain means by a predetermined amount.

13. A camera as described in claim 12, wherein said detecting means comprises resilient means for urging said cassette detecting portion for normal protrusion in a direction toward said cassette accommodating chamber.

14. A photographic camera including;
(a) a camera housing comprising;
   a cassette accommodating chamber provided with an opening through which a film cassette containing a film is loaded by the application of force and removed; and
   a photographic optical instrument chamber formed in communication with said cassette accommodating chamber;
(b) photographic lens means for introducing an image beam of light into said photographic optical instrument chamber;
(c) reflection mirror arranged in said photographic optical instrument chamber to direct said image beam from said photographic lens means to said cassette accommodating chamber;
(d) dustproof shutter means comprising;
   shutter curtain means selectively arranged between said cassette accommodating chamber and said photographic optical instrument chamber for providing a shield between said cassette accommodating chamber and said photographic optical instrument chamber; and
   resilient means for urging said shutter curtain means for normal arrangement between said cassette accommodating chamber and said photographic optical instrument chamber; and
(e) detecting means for detecting the loading and removal of said cassette in and from said cassette accommodating chamber, a portion of said detecting means extending into said cassette accommodating chamber for operative connection with said shutter curtain means, said shutter curtain means being transported from a space between said film accommodating chamber and said photographic optical instrument chamber against the force of said resilient means by receiving the loading force of said cassette in engagement at said portion of said detecting means with a portion of said cassette.

15. A camera as described in claim 14, wherein at least one of said reflection mirror means is selectively displaceable between a position where said image beam introduced by said photographic lens means is directed to said cassette accommodating chamber and a position where said image beam is directed to a finder optical path.

16. A camera as described in claim 15, wherein said reflection mirror means displaceable between said two positions is provided with blocking means for blocking said finder optical path when said reflection mirror means is set in the position where said image beam introduced by said photographic lens means is directed to said cassette accommodating chamber.

* * * * *